INVENTORS
LAWRENCE R. MANONI
ROBERT A. MARSHALL
BY *Vernon F. Hauschild*
ATTORNEY

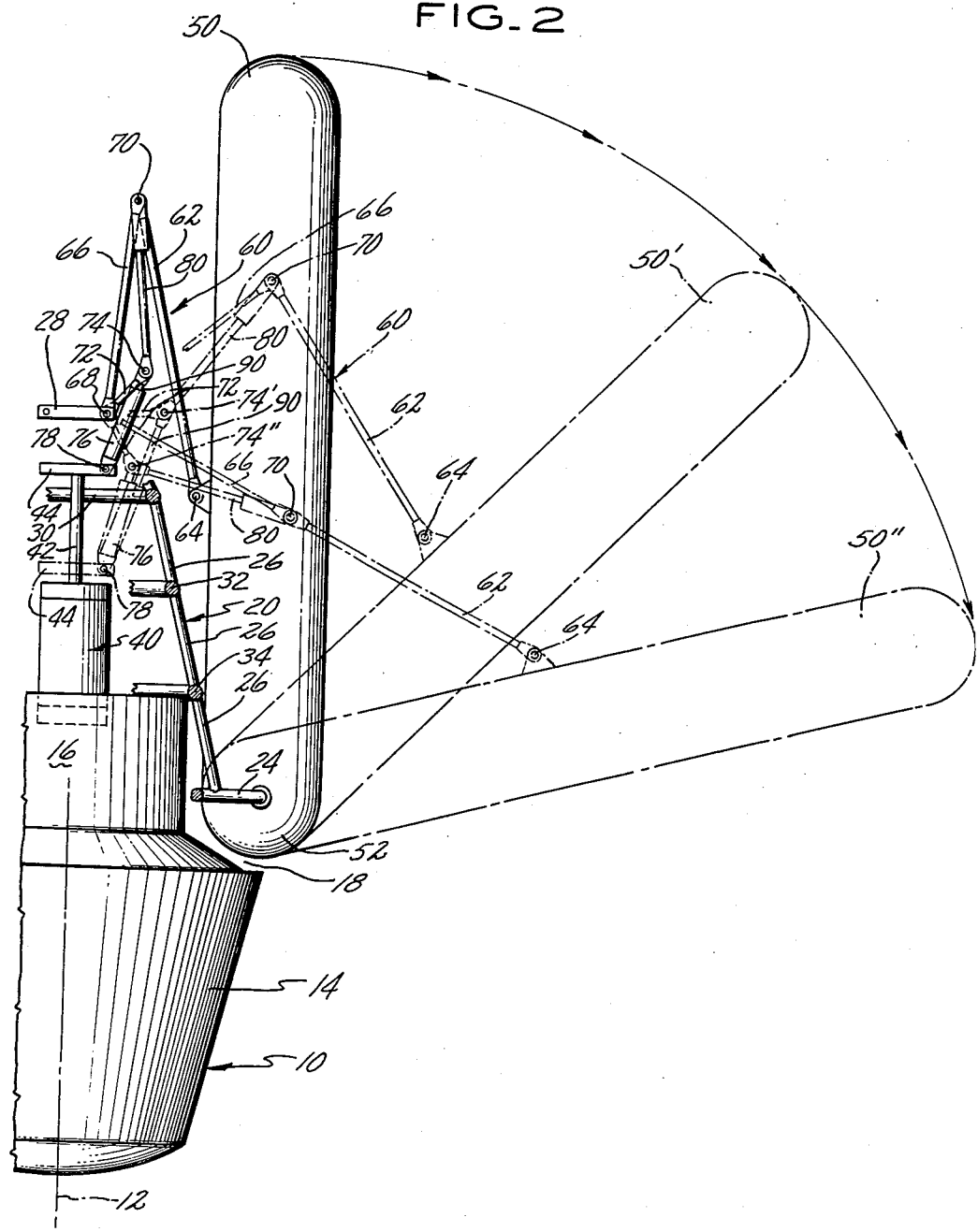

United States Patent Office 3,105,658
Patented Oct. 1, 1963

3,105,658
VARIABLE LIFT-DRAG RE-ENTRY VEHICLE
Robert A. Marshall, Windsor Locks, and Larry Manoni, Jr., Wethersfield, Conn., assignors to United Aircraft Corporation, East Hartford, Conn., a corporation of Delaware
Filed Mar. 30, 1962, Ser. No. 183,847
6 Claims. (Cl. 244—1)

This invention relates to space vehicles and more particularly to the control of the speed and direction of the reentry thereof to the earth's atmosphere and surface.

It is an object of this invention to teach apparatus to control the drag and hence speed and also the attitude and hence lift of a reentry space vehicle.

It is a further object of this invention to so control a reentry space vehicle by the use of fuel or propellant tanks which extend axially along and are positioned circumferentially about the reentry vehicle when in their retracted positions and which may be individually or uniformly as a plurality actuated into a substantially radial drag position wherein the fuel tanks individually control vehicle attitude and hence flight path and collectively control vehicle drag and hence speed.

It is a further object of this invention to provide a reentry body which may be attached to the booster stages of the earth launch vehicle with minimum packaging problems.

Other objects and advantages will be evident from a reading of the accompanying description in the light of the drawings to which they refer, which are:

FIG. 2 is a showing of my drag and attitude control mechanism attached to a reentry capsule and which is partially removed to illustrate the fuel tanks in their retracted, axial position in solid lines and to show the fuel tanks in two typical operative or drag positions in phantom.

Figure 1:
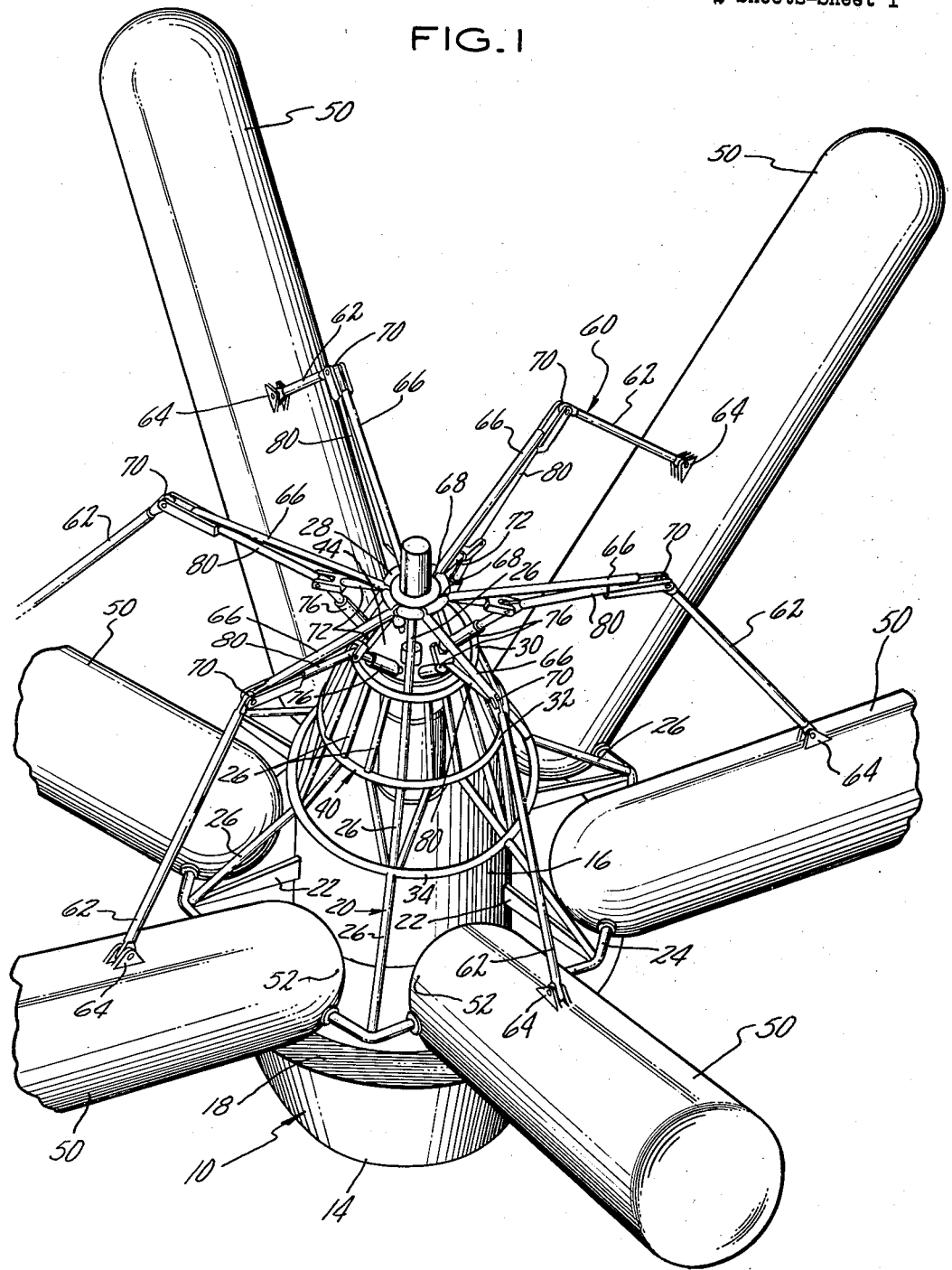
FIG. 1 is a perspective showing of my drag and attitude control on a reentry capsule and shown in its operative or drag position.

Referring to FIGS. 1 and 2, we see reentry vehicle or capsule 10 which is symmetric about axis 12 and which includes cone-shaped forward end 14 and after end 16 which is of reduced radial dimension with respect to forward end 14 so as to form a circumferentially recessed section 18.

Frame 20 is attached to reentry capsule 10 by support rods 22 which are part of an integral forging which forms and reinforces the after end of 16 and which project radially outwardly therefrom at selected circumferential positions thereabout to attach to and support ring 24. Frame 20 is of generally conical shape and tapering in a direction opposite to the forward cone section 14 of reentry capsule 10. Frame 20 further includes circumferentially positioned rods 26 which extend from forward ring 24, which is positioned within circumferential recess 18, to after ring 28. Additional support rings 30, 32, and 34 are positioned along rods 26 between forward ring 24 and after ring 28. The integral forging including rods 22 described supra also serves as an anchoring device for the parachute packages (not shown) which will be extended in the final descending mode.

Actuating means 40, which may be a cylinder with a power piston caused to reciprocate by fluid pressure, is attached to the after end 16 of reentry capsule 10 and extends axially rearwardly thereof. Connecting rod 42 extends from the reciprocable piston and is connected and moves movable member 44.

A plurality of circumferentially positioned and spaced fuel tanks 50 are pivotally attached at their forward ends to forward support ring 24. Fuel tanks 50 are free of fuel, having previously expended the fuel in propelling the space vehicle. Fuel tanks 50 may be pivoted to any position between a retracted position shown in solid lines in FIG. 2 wherein the fuel tanks are circumferentially positioned and spaced concentrically about axis 12 and extend parallel thereto, and an operative, drag position shown in FIG. 1 and in phantom and identified as reference numeral 50″ in FIG. 2. In the fully operative or drag position of FIG. 1 or 50″ of FIG. 2, it will be noted that the fuel tanks are substantially radially extending. By proper control, fuel tanks 50 may be actuated to any intermediate drag position between the solid lines FIG. 1 and FIG. 2 positions such as the position identified by reference numeral 50′ in FIG. 2.

Fuel tanks 50 are caused to pivot about their forward ends 52 by linkage mechanism 60. Linkage mechanism 60 comprises a first link 62 which is pivotally attached to tank 50 at pivot joint 64, and a second link 66 which is pivotally connected to movable member 28 at pivot connection 68 and which is pivotally attached at its opposite end to first link 62 at pivot connection 70. Linkage mechanism 60 further comprises third link 72 which is pivotally attached to after ring 28 at pivot connection 68 and which is also pivotally attached at pivot connection 72 to fourth link 76. Link 76 is pivotally attached at its opposite end at pivot connection 78 to movable member 44. Link arrangement 60 further comprises fifth link 80 which extends pivotally between pivotal connections 70 and 74.

As best seen in FIG. 2, the movable member 44 in its furthest downward or retracted position, the various links of link mechanism 60 co-act as shown in phantom to position in unison the plurality of fuel tanks 50″ to the fully opeartive, substantially radially extending position wherein they present maximum drag during capsule reentry to slow down the velocity of the capsule. As movable member 44 is caused to move to its fully extended, solid line position of FIG. 2, the various links of linkage mechanism shown in solid in FIG. 2 cause fuel tanks 50 to pivot in unison about their forward ends from their fully extendind (50″) position to their fully retracted solid line FIG. 2 position. It will accordingly be seen that by the reciprocation of movable member 44, the fuel tanks 50 may be moved in unison between their fully retracted position (50) and their fully operative position (50″) and to any intermediate position therebetween (50′). In this manner the drag of the reentry capsule 10 and hence the speed thereof can be equally controlled.

For proper and successful reentry operation, it is necessary that the capsule attitude (direction) be controlled as well as capsule speed. To accomplish this directional or attitude control, it is desirable to have control of the positions of the fuel tanks individually and to cause one or more of the tanks to pivot to an operative position such as 50′ of FIG. 2 and thereby establish differential drag on the reentry capsule to cause a directional or attitude control in rudder fashion. This is accomplished, as best shown in FIG. 2, when movable member is in its phantom or fully extended position and link 76, which is preferably a fluid powered piston-cylinder unit with connecting rod 90 projecting therefrom, causes connecting rod 90 to elongate out of the cylinder in link 76 so as to move connecting point 74 from its 74′ to its 74″ position, thereby causing links 72, 66, and 80 to pivot counterclockwise and link 62 to pivot clockwise to bring fuel tank 50 from its fully operative drag (50″ FIG. 2) position to its partially retracted (50′ FIG. 2) position.

It will be obvious to those skilled in the art that a vector or attitude control may be obtained by either actuating one or more fuel tanks to the 50′ (FIG. 2) position while all other fuel tanks remain either fully retracted 50 (FIG. 2) or fully operative drag 50″ (FIG. 2) positions.

The control mechanism which controls the flow of actuating fluid to members 40 and 76 is not shown since it forms no part of this invention.

It is to be understood that the invention is not limited to the specific embodiment herein illustrated and described, but may be used in other ways without departing from its spirit as defined by the following claims.

We claim:

1. A vehicle having an axis and adapted for space flight and reentry to the earth's atmosphere and surface comprising:
   a plurality of axially extending, circumferentially positioned and spaced fuel tanks pivotally attached to the forward reentry end of said vehicle,
   and means to cause said fuel tanks to pivot individually or in unison between a retracted axial position wherein they present minimum vehicle drag to an operative, substantially radial position wherein they collectively vary vehicle drag and individually vary vehicle attitude.

2. Reentry apparatus for a space vehicle having an axis and comprising:
   a reentry capsule having a cone-shaped forward end and an after end of reduced radial dimension,
   a frame attached to said after end and including a forward end positioned immediately rearward of said reentry capsule forward end,
   a plurality of axially extending, circumferentially positioned and spaced fuel tanks pivotally attached at their forward ends to said frame forward end,
   and means to actuate at least one of said fuel tanks between a retracted axial position and an operative, substantially radial drag and attitude correction position.

3. Apparatus according to claim 2 wherein said frame forward end is a ring.

4. Apparatus according to claim 2 wherein said actuating means comprises a movable member, and linkage mechanism pivotally connected to each of said fuel tanks and to said frame and to said movable member.

5. Apparatus according to claim 4 wherein said linkage mechanism comprises for each of said tanks, a first link pivotally attached to said tank, a second link pivotally attached to said frame and also pivotally attached to said first link at a first pivot connection, a third link pivotally attached to said frame, a fourth link pivotally attached to said movable member and to said third link at a second pivot connection, and a fifth link extending pivotally between said first and second pivot connections.

6. Apparatus according to claim 5 wherein said frame is of generally conical shape tapering in a direction opposite to the forward end of said reentry capsule.

References Cited in the file of this patent

UNITED STATES PATENTS

| | | |
|---|---|---|
| 2,977,080 | Zborowski | Mar. 28, 1961 |
| 3,028,122 | Riebe | Apr. 3, 1962 |
| 3,039,721 | Rogers | June 19, 1962 |